United States Patent [19]

Chong

[11] Patent Number: 5,687,420
[45] Date of Patent: Nov. 18, 1997

[54] DEVICE FOR AFFIXING SUNSHADES TO A CAP

[76] Inventor: Tyler O. Chong, 425 E. 86th St., #7-F, New York, N.Y. 10028

[21] Appl. No.: 666,677

[22] Filed: Jun. 18, 1996

[51] Int. Cl.⁶ ........................................... A42B 1/06
[52] U.S. Cl. ................... 2/10; 2/209.13; 2/453; 351/155
[58] Field of Search ........................... 2/10, 209.13, 453; 351/155

[56] References Cited

U.S. PATENT DOCUMENTS

| | | | |
|---|---|---|---|
| 1,955,232 | 4/1934 | Gallaway | 2/10 |
| 5,129,102 | 7/1992 | Solo | 2/10 |

*Primary Examiner*—Diana Biefeld
*Attorney, Agent, or Firm*—Leighton K. Chong

[57] ABSTRACT

A device for affixing sunshades to a cap includes a pair of sunshades fixed to an upper rib with exposed left and right side portions, left and right side anchor members which are affixed to the brim of the cap and have respective clip elements that clip onto the exposed portions of the upper rib of the sunshades to hold the sunshades in position on the brim of the cap. The upper rib also has left and right side cam members positioned on the outer sides of the clip elements which have cam surfaces that abut against stationary surfaces of the anchor members to provide detent positions for maintaining the sunshades stably in either the operative position or an upward, storage position. The anchor members can be clip members or provided with self-adhesive surfaces for attachment to the brim of the cap. The assembly can be pre-assembled with fabricated caps or provided in a retrofit kit for convenient installation by wearers on their own caps.

8 Claims, 2 Drawing Sheets

5,687,420

DEVICE FOR AFFIXING SUNSHADES TO A CAP

FIELD OF THE INVENTION

This invention generally relates to a device for affixing sunshades to a cap and particularly for retrofitting sunshades to a cap with means for retracting them out of the way of the wearer.

BACKGROUND ART

Fans of baseball and other outdoor sports are frequently inconvenienced by the glare of the sun at sporting events when they forget to bring their sunglasses or a cap to shade their eyes. The user also has the inconvenience of having to carry the two objects and store them until they are needed next. When they go indoors in the stadium, they have to remove their sunglasses and carry or place them in their pocket and risk dropping them.

Also, a person wearing prescription lenses does not want the inconvenience of carrying a separate pair of sunglasses, or of switching between the two when going between indoors and outdoors. Various types of clip-on shades are designed for clipping onto the bridge or lens frames of eyeglasses for switching between indoor and outdoor use. However, the clip-on device for the sunshades are often matched to the dimensions or configuration of the specific eyeglass frame, so that if the clip-on shades are lost, they are costly and inconvenient to replace. Also, clip-on shades for eyeglasses have an appearance that is considered to be unfashionable.

SUMMARY OF THE INVENTION

In accordance with the present invention, a device for affixing sunshades to a cap having a brim projecting on a front side thereof over the wearer's face comprises: (a) a pair of sunshades having an upper rib with left and right side portions thereof positioned substantially on opposite sides of the sunshades in a widthwise direction thereof; (b) anchoring means having left and right side members for anchoring to the brim of the cap at positions substantially corresponding to the positions of the left and right side portions of the upper rib of the sunshades when the sunshades are placed in an operative position with respect to said brim; (c) attachment means for attachment of the left and right side members of the anchoring means to the left and right side portions of the upper rib of the sunshades in order to hold the sunshades in the operative position on the brim of the cap.

In the preferred embodiment, the attachment means consists of left and right clip elements mounted on the left and right side members of the anchoring means which clip onto exposed rod-like left and right side portions of the upper rib so that the sunshades can be rotated to an upward position out of the way of the wearer. The upper rib also has a cam surface which abuts against a stationary surface of the anchoring means so as to provide detent positions for maintaining the sunshades stably in position when they are rotated to either the operative position or to the upward position. The anchoring means can be provided with self-adhesive surfaces or clip members for attaching them to the brim of the cap. The assembly can be combined together in a retrofit kit for convenient installation by wearers on their own caps.

Other objects, features and advantages of the present invention are described in detail below in conjunction with the drawings, as follows:

DETAILED DESCRIPTION OF THE INVENTION

Figure 1:
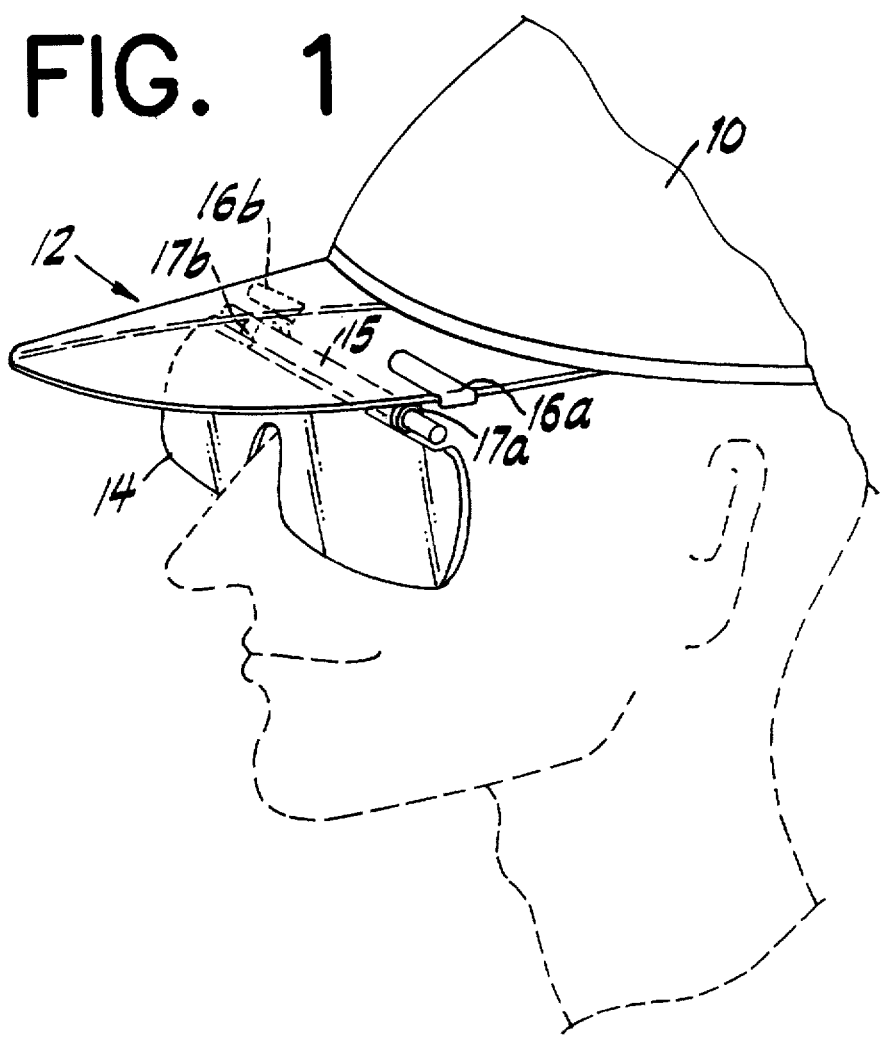
FIG. 1 shows a first embodiment of my device for affixing sunshades to a cap.

FIG. 1 shows a first embodiment of my device for affixing sunshades to a cap. The preferred cap is of the type commonly referred to as a "baseball cap" having a cloth head portion 10 and a stiff brim 12 that projects frontwardly over the wearer's face. Baseball caps have a standard configuration and brim shape which allows the device to be dimensioned for attachment to and proper positioning on the brim. However, the principles disclosed herein can be readily adapted to other types of caps and hats, the only common requirement being that they have a stiff brim extending frontwardly over the wearer's face.

My device includes a pair of sunshades 14 fixed to an upper rib 15 with left and right side portions extending in a widthwise direction across the width of the sunshades, and anchor members 16a, 16b which are affixed on respective sides of the brim and have clip elements 17a, 17b for attachment to the respective left and right side portions of the upper rib 15. The sunshades is typically a plastic sheet stamped and thermally formed with a suitable curvature and is secured to upper rib 15 by welding, fixing in a groove of the rib, or by integral molding with the rib. The anchor member 16a, 16b, clip elements 17a, 17b, upper rib 15, and sunshades 14 form an assembly together which holds the sunshades in the operative position on the brim of the cap.

In this first embodiment, the anchor members 16a, 16b consist of left and right side clip members having spring legs which are press fitted onto the outer edge of the brim on its opposite sides. The clip elements 17a, 17b are integrally formed with the clip members 16a, 16b. For example, they may be molded as an integral plastic piece. The clip elements have stiff arcuate sections with an opening at the downward side for snap fitting onto the exposed rod-like surface of the upper rib so that the rib is rotatably held by the clip elements. The rib and sunshades can thus be rotated between a downward, operative position for sunshades, and an upward, storage position.

The above-described device is easily retrofitted to a cap by press fitting the clip members on the brim and attaching the sunshades by snapping the rib portions into the respective clip elements. The assembly is also detachable in the reverse manner. The assembly can be combined together in a retrofit kit for sale onsite at sporting events and convenient installation by wearers on their own caps. Alternatively, the device can be pre-assembled as a fixture on the cap.

Figure 2:
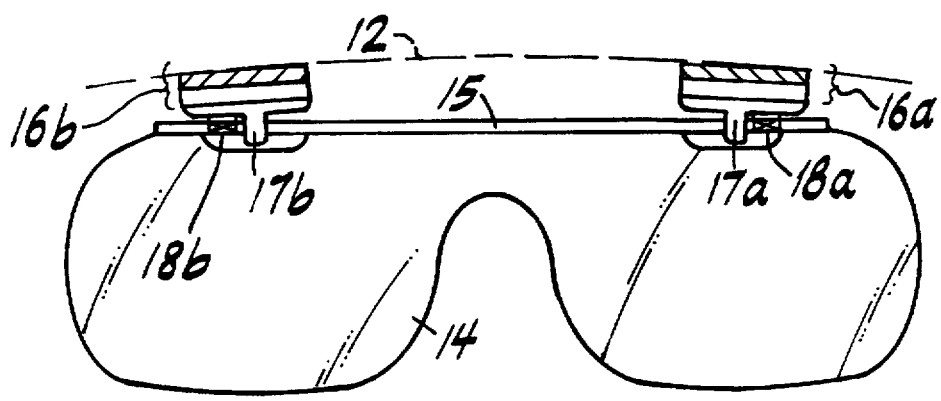
FIG. 2 shows a second embodiment of my device for affixing sunshades to a cap.

FIG. 2 shows a second embodiment of my device having sunshades 14 fixed (shown fitted in a groove) to an upper rib 15 rotatably held by clip elements 17a, 17b of the anchor members 16a, 16b, which are in the form of pads provided with self-adhesive layers for adhering onto the lower surface of the brim 12. The adhesive may be any type of suitable resin adhesive commonly used. For a retrofit kit, the adhesive layers are covered with a release sheet which is removed to expose the adhesive so that each anchor member can be adhered in the proper position on the brim.

The rib 15 preferably has left and right side cam members 18a, 18b stamped or fixed onto the upper rib 15 at positions adjacent the outer sides of the clip elements 17a, 17b. The cam members 18a, 18b have flat surfaces (shown more clearly in FIG. 3) which protrude sufficiently so as to abut against the stationary surfaces of the anchor members 16a, 16b so that the sunshades are held stably in either the operative or storage positions. The cam members serve the dual purpose of holding the rib and sunshades from lateral movement once they are attached in position to the clip elements. Due to the adhesive, this embodiment remains permanently affixed to the cap. However, rotation of the shades to the upper, storage position allows them to lie flush under the brim, and the cap can thus be handled and stored together with the shades conveniently.

Figure 3:
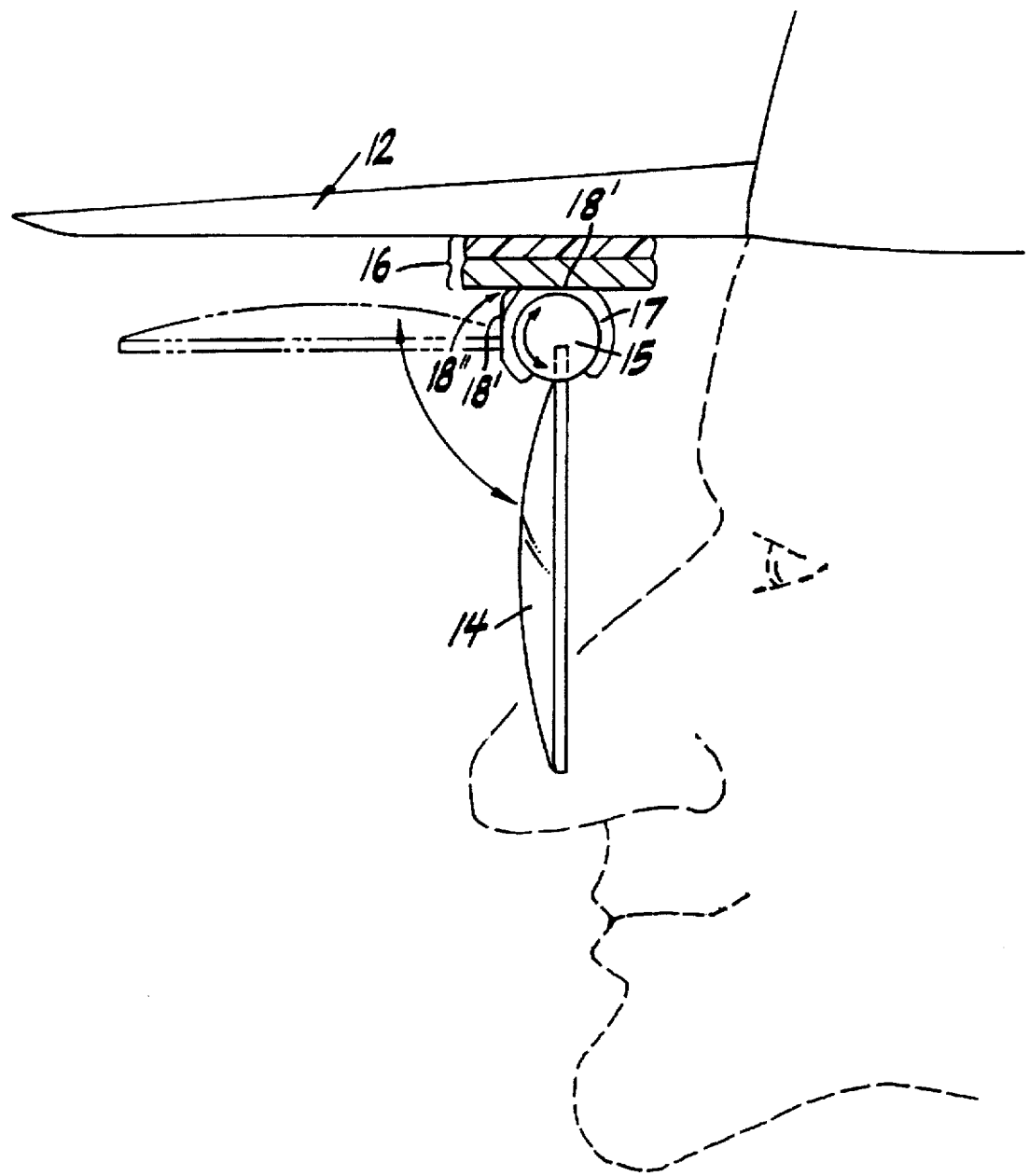
FIG. 3 shows a detail of the clip elements allowing rotation of the sunshades and a cam surface for maintaining the sunshades stably in position with respect to the brim.

In FIG. 3, the cam member 18 (for each side) is shown in greater detail having flat surfaces 18' provided at its upper quadrant and at its forwardly facing quadrant. When the rib 15 is rotated to either the downward, operative position or the upward, storage position, the flat surfaces abut against the corresponding flat surface of the anchor member 16 so that the sunshades are held stably in the desired position. A squared corner 18" is provided between the flat surfaces 18' to give it an "over-center" detent action that requires an increased torque to displace the sunshades from one detent position to the other. Thus, the sunshades will not be readily dislodged out of position unless positively rotated by the wearer.

The device of the present invention can be pre-assembled with fabricated caps or provided in a retrofit kit for convenient installation by wearers on their own caps. The sunshades are affixed to caps so that both articles can be stored, used, and carried together. For storage, the sunshades are rotated to the upper position where they lie flat under and are protected by the stiff brim of the cap. Since the sunshades are spaced from the wearer's face in the operative position (see FIG. 3), the wearer can also wear their own glasses behind the shades, so that they do not have to carry separate prescription sunglasses.

Although the invention has been described with reference to the preferred embodiments, it will be appreciated that many other variations and modifications thereof may be devised in accordance with the principles disclosed herein. The invention, including the described embodiments and all such variations and modifications thereof, is defined in the following claims.

I claim:

1. A device for affixing sunshades to a cap having a brim projecting on a front side thereof over a wearer's face comprising:
   (a) a pair of sunshades having an upper rib with left and right side portions thereof positioned substantially on opposite sides of the sunshades in a widthwise direction thereof;
   (b) anchoring means having left and right side members for anchoring to the brim of the cap at positions substantially corresponding to the positions of the left and right side portions of the upper rib of the sunshades when the sunshades are placed in an operative position with respect to said brim; and
   (c) attachment means for attachment of the left and right side members of the anchoring means to the left and right side portions of the upper rib of the sunshades in order to hold the sunshades in the operative position on the brim of the cap,
   wherein said upper rib has a cam surface which abuts against a stationary surface of said anchoring means so as to provide a detent position for maintaining the sunshades stably in position when they are rotated to or from the operative position.

2. A device according to claim 1, wherein said attachment means includes left and right clip elements mounted on said left and right side members of said anchoring means which clip onto exposed left and right side portions of the upper rib so that the sunshades are rotatably held by said clip elements and can be rotated to an upward position out of the way of a wearer.

3. A device according to claim 1, wherein said anchoring means include left and right side clip members having spring legs which are press fitted onto the brim of the cap on opposite left and right sides thereof.

4. A device according to claim 1, wherein said anchoring means include left and right side adhesive members having self-adhesive layers which are adhered in respective left and right side positions onto the brim of the cap.

5. A device for affixing sunshades to a cap having a brim projecting on a front side thereof over a wearer's face comprising:
   (a) a pair of sunshades having an upper rib with left and right side portions thereof positioned substantially on opposite sides of the sunshades in a widthwise direction thereof;
   (b) anchoring means having left and right side members for anchoring to the brim of the cap at positions substantially corresponding to the positions of the left and right side portions of the upper rib of the sunshades when the sunshades are placed in an operative position with respect to said brim; and
   (c) attachment means for attachment of the left and right side members of the anchoring means to the left and right side portions of the upper rib of the sunshades in order to hold the sunshades in the operative position on the brim of the cap,
   wherein said attachment means includes left and right clip elements mounted on said left and right side members of said anchoring means which clip onto exposed left and right side portions of the upper rib so that the sunshades are rotatably held by said clip elements and can be rotated to an upward position out of the way of the wearer, and
   wherein said upper rib has left and right side cam members which are stamped or fixed onto said upper rib at positions adjacent respective outer sides of the clip elements for holding said upper rib and sunshades from lateral movement once they are attached in position to the clip elements.

6. A device according to claim 5, wherein said left and right side cam members each have flat surfaces (18') provided at its upper quadrant and at its forwardly facing quadrant to provide detent positions for said upper rib and sunshades when they are rotated to the operative position or upwardly to a storage position.

7. A device according to claim 6, wherein a squared corner is provided between said flat surfaces at the upper and forwardly facing quadrants of each cam member for providing an "over-center" action that requires an increased torque to displace the sunshades from one detent position to the other.

8. A cap pre-assembled with sunshades comprising:
   (a) a cap having a head portion and a brim projecting on a front side thereof;
   (b) a pair of sunshades having an upper rib with left and right side portions thereof positioned substantially on opposite sides of the sunshades in a widthwise direction thereof;

(c) anchoring means having left and right side members for anchoring to the brim of the cap at positions substantially corresponding to the positions of the left and right side portions of the upper rib of the sunshades when the sunshades are placed in an operative position with respect to said brim; and (d) attachment means for attachment of the left and right side members of the anchoring means to the left and right side portions of the upper rib of the sunshades in order to hold the sunshades in the operative position on the brim of the cap, wherein said upper rib has a cam surface which abuts against a stationary surface of said anchoring means so as to provide a detent position for maintaining the sunshades stably in position when they are rotated to or from the operative position.

* * * * *